US009992253B2

(12) United States Patent
Thomas et al.

(10) Patent No.: US 9,992,253 B2
(45) Date of Patent: *Jun. 5, 2018

(54) NON-INVASIVE REMOTE ACCESS TO AN APPLICATION PROGRAM

(75) Inventors: Monroe M. Thomas, Calgary (CA); Glen Lehmann, Crossfield (CA); Matt Stephure, Calgary (CA); David B. McFadzean, Calgary (CA); Pierre Lemire, Calgary (CA); Torin Arni Taerum, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/586,007

(22) Filed: Aug. 15, 2012

(65) Prior Publication Data

US 2013/0046815 A1 Feb. 21, 2013

Related U.S. Application Data

(60) Provisional application No. 61/523,632, filed on Aug. 15, 2011, provisional application No. 61/523,644, filed on Aug. 15, 2011.

(51) Int. Cl.
*H04L 29/08* (2006.01)
*G06F 9/54* (2006.01)
*G06F 9/44* (2018.01)

(52) U.S. Cl.
CPC ............ *H04L 67/02* (2013.01); *G06F 9/4445* (2013.01); *G06F 9/54* (2013.01)

(58) Field of Classification Search
CPC .................................. H04L 67/02; G06F 15/16
USPC .......................................................... 709/217
See application file for complete search history.

(56) References Cited

U.S. PATENT DOCUMENTS

| 4,975,690 | A | 12/1990 | Torres |
| 5,345,550 | A | 9/1994 | Bloomfield |
| 5,555,003 | A | 9/1996 | Montgomery et al. |
| 5,742,778 | A | 4/1998 | Hao et al. |
| 5,844,553 | A | 12/1998 | Hao et al. |

(Continued)

FOREIGN PATENT DOCUMENTS

| CN | 102821413 | 12/2012 |
| EP | 0349463 | 1/1990 |

(Continued)

OTHER PUBLICATIONS

Extended European Search Report, dated Jun. 2, 2014, received in connection with European Application No. 12760310.8.

(Continued)

*Primary Examiner* — Tauqir Hussain
*Assistant Examiner* — Steve Lin
(74) *Attorney, Agent, or Firm* — Meunier Carlin & Curfman LLC

(57) ABSTRACT

Systems and methods for providing remote access to an application program. A server remote access program may cooperate with a screen scraping application to provide screen data to a client computing device. The display associated with the application program may be resized or cropped by a server for display on the client computing device. The client may connect to the server using a client remote access program that receives inputs from a user interface program.

10 Claims, 8 Drawing Sheets

(56) References Cited

U.S. PATENT DOCUMENTS

| | | | |
|---|---|---|---|
| 5,870,759 A | 2/1999 | Bauer et al. | |
| 5,909,545 A | 6/1999 | Frese, II et al. | |
| 5,920,311 A | 7/1999 | Anthias | |
| 5,978,842 A | 11/1999 | Noble et al. | |
| 6,045,048 A | 4/2000 | Wilz et al. | |
| 6,061,689 A | 5/2000 | Chang et al. | |
| 6,075,531 A | 6/2000 | DeStefano | |
| 6,141,698 A | 10/2000 | Krishnan et al. | |
| 6,145,098 A | 11/2000 | Nouri et al. | |
| 6,253,228 B1 | 6/2001 | Ferris et al. | |
| 6,343,313 B1* | 1/2002 | Salesky | G06F 3/1415 709/203 |
| 6,453,334 B1 | 9/2002 | Vinson et al. | |
| 6,453,356 B1 | 9/2002 | Sheard et al. | |
| 6,570,563 B1 | 5/2003 | Honda | |
| 6,601,233 B1 | 7/2003 | Underwood | |
| 6,792,607 B1 | 9/2004 | Burd et al. | |
| 6,918,113 B2 | 7/2005 | Patel et al. | |
| 6,938,096 B1 | 8/2005 | Greschler et al. | |
| 6,970,459 B1 | 11/2005 | Meier | |
| 6,976,077 B1 | 12/2005 | Lehew et al. | |
| 7,065,568 B2 | 6/2006 | Bracewell et al. | |
| 7,069,227 B1 | 6/2006 | Lintel, III et al. | |
| 7,073,059 B2 | 7/2006 | Worely et al. | |
| 7,149,761 B2 | 12/2006 | Cooke et al. | |
| 7,167,893 B1 | 1/2007 | Malone et al. | |
| 7,174,504 B2 | 2/2007 | Tsao | |
| 7,181,686 B1 | 2/2007 | Bahrs | |
| 7,193,985 B1 | 3/2007 | Lewis et al. | |
| 7,240,162 B2 | 7/2007 | de Vries | |
| 7,246,063 B2 | 7/2007 | James et al. | |
| 7,320,131 B1 | 1/2008 | O'Toole, Jr. | |
| 7,343,310 B1 | 3/2008 | Stender | |
| 7,350,151 B1 | 3/2008 | Nakajima | |
| 7,418,711 B1 | 8/2008 | Lee et al. | |
| 7,451,196 B1 | 11/2008 | de Vries et al. | |
| 7,577,751 B2 | 8/2009 | Vinson et al. | |
| 7,620,901 B2 | 11/2009 | Carpenter et al. | |
| 7,647,370 B1 | 1/2010 | Liu et al. | |
| 7,650,444 B2 | 1/2010 | Dirstine et al. | |
| 7,656,799 B2 | 2/2010 | Samuels et al. | |
| 7,703,024 B2* | 4/2010 | Kautzleben | G06F 9/4445 709/201 |
| 7,706,399 B2 | 4/2010 | Janczak | |
| 7,725,331 B2 | 5/2010 | Schurenberg et al. | |
| 7,802,183 B1 | 9/2010 | Essin | |
| 7,831,919 B1 | 11/2010 | Viljoen et al. | |
| 7,921,078 B2 | 4/2011 | McCuller | |
| 7,941,488 B2 | 5/2011 | Goodman et al. | |
| 7,966,572 B2 | 6/2011 | Matthews et al. | |
| 8,024,523 B2 | 9/2011 | de Vries et al. | |
| 8,261,345 B2 | 9/2012 | Hitomi et al. | |
| 8,356,252 B2 | 1/2013 | Raman et al. | |
| 8,359,591 B2 | 1/2013 | de Vries et al. | |
| 8,509,230 B2 | 8/2013 | Vinson et al. | |
| 8,527,706 B2 | 9/2013 | de Vries et al. | |
| 8,572,178 B1 | 10/2013 | Frazzini et al. | |
| 8,606,952 B2* | 12/2013 | Pasetto et al. | 709/231 |
| 8,607,158 B2* | 12/2013 | Molander | G06F 9/54 715/764 |
| 8,627,081 B2 | 1/2014 | Grimen et al. | |
| 8,667,054 B2* | 3/2014 | Tahan | G06F 19/321 709/203 |
| 8,832,260 B2 | 9/2014 | Raja et al. | |
| 8,924,512 B2 | 12/2014 | Stoyanov et al. | |
| 2001/0047393 A1* | 11/2001 | Arner et al. | 709/216 |
| 2002/0032751 A1 | 3/2002 | Bharadwaj | |
| 2002/0032804 A1 | 3/2002 | Hunt | |
| 2002/0092029 A1 | 7/2002 | Smith | |
| 2003/0014735 A1 | 1/2003 | Achlioptas et al. | |
| 2003/0023670 A1 | 1/2003 | Walrath | |
| 2003/0055893 A1* | 3/2003 | Sato | G06Q 10/107 709/204 |
| 2003/0065738 A1 | 4/2003 | Yang et al. | |
| 2003/0120324 A1 | 6/2003 | Osborn et al. | |
| 2003/0120762 A1 | 6/2003 | Yepishin et al. | |
| 2003/0149941 A1 | 8/2003 | Tsao | |
| 2003/0163514 A1 | 8/2003 | Waldschmidt | |
| 2003/0184584 A1 | 10/2003 | Vachuska et al. | |
| 2003/0208472 A1 | 11/2003 | Pham | |
| 2004/0015842 A1 | 1/2004 | Nanivadekar et al. | |
| 2004/0029638 A1 | 2/2004 | Hytcheson et al. | |
| 2004/0039742 A1 | 2/2004 | Barsness et al. | |
| 2004/0068516 A1 | 4/2004 | Lee et al. | |
| 2004/0106916 A1 | 6/2004 | Quaid et al. | |
| 2004/0117804 A1 | 6/2004 | Scahill et al. | |
| 2004/0153525 A1 | 8/2004 | Borella | |
| 2004/0162876 A1 | 8/2004 | Kohavi | |
| 2004/0183827 A1 | 9/2004 | Putterman et al. | |
| 2004/0236633 A1 | 11/2004 | Knauerhase et al. | |
| 2004/0243919 A1 | 12/2004 | Muresan et al. | |
| 2004/0249885 A1 | 12/2004 | Petropoulakis et al. | |
| 2005/0005024 A1 | 1/2005 | Samuels et al. | |
| 2005/0010871 A1 | 1/2005 | Ruthfield et al. | |
| 2005/0021687 A1 | 1/2005 | Anastassopoulos et al. | |
| 2005/0050229 A1 | 3/2005 | Comeau et al. | |
| 2005/0138631 A1 | 6/2005 | Bellotti et al. | |
| 2005/0188046 A1 | 8/2005 | Hickman et al. | |
| 2005/0188313 A1 | 8/2005 | Matthews et al. | |
| 2005/0198578 A1* | 9/2005 | Agrawala | G06F 9/4443 715/750 |
| 2005/0240906 A1 | 10/2005 | Kinderknecht et al. | |
| 2006/0004874 A1 | 1/2006 | Hutcheson et al. | |
| 2006/0026006 A1 | 2/2006 | Hindle | |
| 2006/0031377 A1 | 2/2006 | Ng et al. | |
| 2006/0036770 A1 | 2/2006 | Hosn et al. | |
| 2006/0085835 A1 | 4/2006 | Istvan et al. | |
| 2006/0101397 A1 | 5/2006 | Mercer et al. | |
| 2006/0130069 A1 | 6/2006 | Srinivasan et al. | |
| 2006/0231175 A1 | 10/2006 | Vondracek et al. | |
| 2006/0236328 A1 | 10/2006 | DeWitt | |
| 2006/0258462 A1 | 11/2006 | Cheng et al. | |
| 2006/0265689 A1 | 11/2006 | Kuznetsov et al. | |
| 2006/0271563 A1 | 11/2006 | Angelo et al. | |
| 2006/0288171 A1 | 12/2006 | Tsien | |
| 2006/0294418 A1 | 12/2006 | Fuchs | |
| 2007/0024645 A1 | 2/2007 | Purcell et al. | |
| 2007/0047535 A1 | 3/2007 | Varma | |
| 2007/0067754 A1 | 3/2007 | Chen et al. | |
| 2007/0079244 A1 | 4/2007 | Brugiolo | |
| 2007/0112880 A1 | 5/2007 | Yang et al. | |
| 2007/0120763 A1 | 5/2007 | De Paepe et al. | |
| 2007/0130292 A1 | 6/2007 | Tzruya et al. | |
| 2007/0136677 A1 | 6/2007 | Agarwal | |
| 2007/0203944 A1 | 8/2007 | Batra et al. | |
| 2007/0208718 A1 | 9/2007 | Javid et al. | |
| 2007/0226636 A1 | 9/2007 | Carpenter et al. | |
| 2007/0244990 A1* | 10/2007 | Wells | 709/218 |
| 2007/0256073 A1 | 11/2007 | Truong et al. | |
| 2007/0282951 A1 | 12/2007 | Selimis et al. | |
| 2008/0016155 A1* | 1/2008 | Khalatian | G06F 3/038 709/204 |
| 2008/0134211 A1 | 6/2008 | Cui | |
| 2008/0146194 A1 | 6/2008 | Yang et al. | |
| 2008/0183190 A1 | 7/2008 | Adcox et al. | |
| 2008/0313282 A1 | 12/2008 | Warila et al. | |
| 2009/0080523 A1 | 3/2009 | McDowell | |
| 2009/0089742 A1 | 4/2009 | Nagulu et al. | |
| 2009/0119644 A1 | 5/2009 | de Vries et al. | |
| 2009/0209239 A1 | 8/2009 | Montesdeoca | |
| 2009/0217177 A1 | 8/2009 | DeGrazia | |
| 2009/0044171 A1 | 12/2009 | Avadhanula | |
| 2010/0061238 A1 | 3/2010 | Godbole et al. | |
| 2010/0077058 A1* | 3/2010 | Messer | 709/219 |
| 2010/0131591 A1 | 5/2010 | Thomas et al. | |
| 2010/0150031 A1 | 6/2010 | Allen et al. | |
| 2010/0174773 A1* | 7/2010 | Penner et al. | 709/203 |
| 2010/0205147 A1 | 8/2010 | Lee | |
| 2010/0223566 A1 | 9/2010 | Holmes et al. | |
| 2010/0268762 A1 | 10/2010 | Pahlavan et al. | |
| 2010/0268813 A1 | 10/2010 | Pahlavan et al. | |
| 2011/0138283 A1 | 6/2011 | Marston | |

(56) References Cited

U.S. PATENT DOCUMENTS

| | | | |
|---|---|---|---|
| 2011/0145863 A1* | 6/2011 | Alsina | G06F 9/4445 725/44 |
| 2011/0157196 A1 | 6/2011 | Nave et al. | |
| 2011/0162062 A1 | 6/2011 | Kumar et al. | |
| 2011/0184993 A1 | 7/2011 | Chawla et al. | |
| 2011/0213830 A1 | 9/2011 | Lopez et al. | |
| 2011/0222442 A1 | 9/2011 | Cole et al. | |
| 2011/0246891 A1* | 10/2011 | Schubert | G06F 9/4445 715/719 |
| 2011/0252152 A1 | 10/2011 | Sherry et al. | |
| 2011/0314093 A1* | 12/2011 | Sheu | G06F 9/4445 709/203 |
| 2012/0030275 A1 | 2/2012 | Boller et al. | |
| 2012/0084713 A1 | 4/2012 | Desai et al. | |
| 2012/0090004 A1 | 4/2012 | Jeong | |
| 2012/0133675 A1 | 5/2012 | McDowell | |
| 2012/0154633 A1 | 6/2012 | Rodriguez | |
| 2012/0221792 A1 | 8/2012 | de Vries et al. | |
| 2012/0226742 A1 | 9/2012 | Momchilov et al. | |
| 2012/0245918 A1 | 9/2012 | Overton et al. | |
| 2012/0246225 A1 | 9/2012 | Lemire et al. | |
| 2012/0324032 A1* | 12/2012 | Chan | 709/206 |
| 2012/0324358 A1 | 12/2012 | Jooste | |
| 2013/0007227 A1 | 1/2013 | Hitomi et al. | |
| 2013/0013671 A1* | 1/2013 | Relan | H04L 67/34 709/203 |
| 2013/0031618 A1 | 1/2013 | Momchilov | |
| 2013/0046816 A1 | 2/2013 | Thomas et al. | |
| 2013/0054679 A1* | 2/2013 | Jooste | 709/203 |
| 2013/0070740 A1 | 3/2013 | Yovin | |
| 2013/0117474 A1 | 5/2013 | Ajanovic et al. | |
| 2013/0138791 A1 | 5/2013 | Thomas et al. | |
| 2013/0147845 A1 | 6/2013 | Xie et al. | |
| 2013/0159062 A1 | 6/2013 | Stiehl | |
| 2013/0179962 A1 | 7/2013 | Arai et al. | |
| 2013/0212483 A1* | 8/2013 | Brakensiek | G06F 9/4445 715/740 |
| 2013/0262566 A1 | 10/2013 | Stephure et al. | |
| 2013/0346482 A1 | 12/2013 | Holmes | |
| 2014/0240524 A1 | 8/2014 | Julia et al. | |
| 2014/0241229 A1 | 8/2014 | Bertorelle et al. | |
| 2014/0298420 A1 | 10/2014 | Barton et al. | |
| 2015/0067769 A1 | 3/2015 | Barton et al. | |
| 2015/0156133 A1 | 6/2015 | Leitch et al. | |
| 2015/0163292 A1 | 6/2015 | Lemire et al. | |
| 2015/0319252 A1 | 11/2015 | Momchilov et al. | |
| 2016/0054897 A1 | 2/2016 | Holmes et al. | |
| 2016/0226979 A1 | 8/2016 | Lancaster et al. | |

FOREIGN PATENT DOCUMENTS

| | | |
|---|---|---|
| EP | 1422901 | 5/2004 |
| JP | 2007084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 4405812 | 1/2010 |
| JP | 2010-256972 | 11/2010 |
| RU | 2295752 | 3/2007 |
| RU | 2298287 | 4/2007 |
| RU | 2305860 | 9/2007 |
| WO | 1998/058478 | 12/1998 |
| WO | 2001/016724 | 3/2001 |
| WO | 2002/009106 | 1/2002 |
| WO | 2003/032569 | 4/2003 |
| WO | 2003083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 9/2012 |
| WO | 2012127308 | 9/2012 |
| WO | 2013/024343 | 2/2013 |
| WO | 2013/109984 | 7/2013 |
| WO | 2013128284 | 9/2013 |
| WO | 2013/153439 | 10/2013 |
| WO | 2015/080845 | 6/2015 |

OTHER PUBLICATIONS

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5$^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

International Search Report, dated Dec. 28, 2012, in connection with International Application No. PCT/IB2012/001590.

International Preliminary Report on Patentability and Written Opinion, dated Feb. 18, 2014, in connection with International Application No. PCT/IB2012/001590.

International Search Report and Written Opinion, dated Aug. 21, 2013, in connection with International Application No. PCT/IB2013/000676.

International Search Report and Written Opinion, dated Jul. 31, 2013, in connection with International Application No. PCT/IB2013/000720.

Extended European Search Report, dated Mar. 3, 2015, received in connection with related European Application No. 09828497.9.

European Search Report, dated Sep. 29, 2015, received in connection with European Patent Application No. 12824363.1.

European Search Report, dated Sep. 1, 2015, received in connection with European Patent Application No. 12824077.7.

European Search Report, dated Jul. 5, 2012, received in connection with European Patent Application No. 10738183.2.

International Preliminary Report on Patentability and Written Opinion, dated Sep. 24, 2013, received in connection with International Patent Application No. PCT/162012/000562.

(56) References Cited

OTHER PUBLICATIONS

International Preliminary Report on Patentability and Written Opinion, dated Oct. 14, 2014, received in connection with International Patent Application No. PCT/IB2013/000676.
International Preliminary Report on Patentability and Written Opinion, dated Sep. 2, 2014, received in connection with International Patent Application No. PCT/IB2013/000720.
International Preliminary Report on Patentability and Written Opinion, dated May 31, 2016, received in connection International Patent Application No. PCT/US2014/064243.
Search Report and Written Opinion, dated Nov. 16, 2015, received in connection with SG Application No. 2013087150.
International Search Report and Written Opinion, dated Mar. 19, 2015, received in connection with International Application No. PCT/US2014/064243.
International Search Report and Written Opinion, dated Jun. 30, 2016, received in connection International Patent Application No. PCT/IB2016/000277.

* cited by examiner

NON-INVASIVE REMOTE ACCESS TO AN APPLICATION PROGRAM

CROSS-REFERENCE TO RELATED APPLICATIONS

The present application claims priority to U.S. Provisional Patent Application Nos. 61/523,632 and 61/523,644, each filed on Aug. 15, 2011 and entitled "Non-Invasive Remote Access to an Application Program." The above-referenced applications are incorporated herein by reference in their entireties.

BACKGROUND

Ubiquitous remote access to application programs and data has become commonplace as a result of the growth and availability of broadband and wireless network access. In addition, users are accessing application programs and data using an ever-growing variety of client devices (e.g., mobile devices, table computing devices, laptop/notebook/desktop computers, etc.). Data may be communicated to the mobile device from a remote server over a 3G and 4G mobile data networks or wireless networks such as WiFi and WiMax. Most mobile devices have access to the Internet and are able to interact with various types of application programs.

SUMMARY

Disclosed herein are systems and methods for non-invasively providing remote access to an application program executing on, e.g., a server. In accordance with some implementations, a method for providing remote access to a server-based application program is disclosed. The method includes providing a remote access program at a server computing device; receiving a communication at the server computer computing device from a client to access an application; scraping screen data associated with the application; generating presentation data from the screen data; updating a state model containing a corresponding state of the application; and communicating the presentation data and the state model to the client.

In accordance with some implementations, another method of providing remote access to a server-based application program is disclosed. The method may include providing a remote access program at a server computing device; enumerating at least one Uniform Resource Locator (URL) that is associated with at least one application; receiving a communication from a client at the at least one URL; scraping screen data associated with the at least one application associated with the at least one URL; generating presentation data from the screen data; and communicating the presentation data to the client.

In accordance with some implementations, there is provided a method for providing non-invasive remote access to an application program. The method may include providing a server remote access program at a server computing device; providing a screen scraping application that monitors a display interface generated by the application program for changes to the display interface; scraping screen data associated with the display interface; generating presentation data from the screen data; receiving a request at the server computing device to access the application program; updating a state model containing a corresponding state of the application program, wherein the corresponding state includes at least one logical element containing information about the display interface of the application program; and communicating the presentation data and the state model using the server remote access program in response to the request.

In accordance with yet other implementations, there is provided a method of providing remote access to a server-based application program that includes providing a remote access program at a server computing device; determining application programs that are executing on the server computing device; enumerating a Uniform Resource Locator (URL) that is associated with each application program determined by the server computing device to be executing; providing access to the URL of each application program determined by the server computing device to be executing; receiving a selection from a client computing device at the URL of a selected application program; and providing remote access to the application program at the URL.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing and viewing application programs, it will become evident to those skilled in the art that the implementations are not limited thereto.

Referring to FIGS. 1 and 2A-2C, there is illustrated a system 100 for providing remote access to an application program via a computer network. The system 100 may include one or more server computing devices 102A, 102B and one or more client computing devices 112A, 112B, 112C . . . 112N. The client computing devices may include, but are not limited to, a wireless handheld device such as, for example, an IPHONE 112A or a BLACKBERRY 112B connected via a communication network 110 such as, for example, the Internet, to the server computing device 102A and/or the server computing device 102B. Similarly, the client computing devices may also include a desktop/notebook personal computer 112C or a tablet device 112N that are connected by the communication network 110 to the server computing device 102A and/or the server computing device 102B. It is noted that the connections to the communication network 110 may be any type of connection, for example, Wi-Fi (IEEE 802.11x), WiMax (IEEE 802.16), Ethernet, 3G, 4G, etc.

Figure 6:
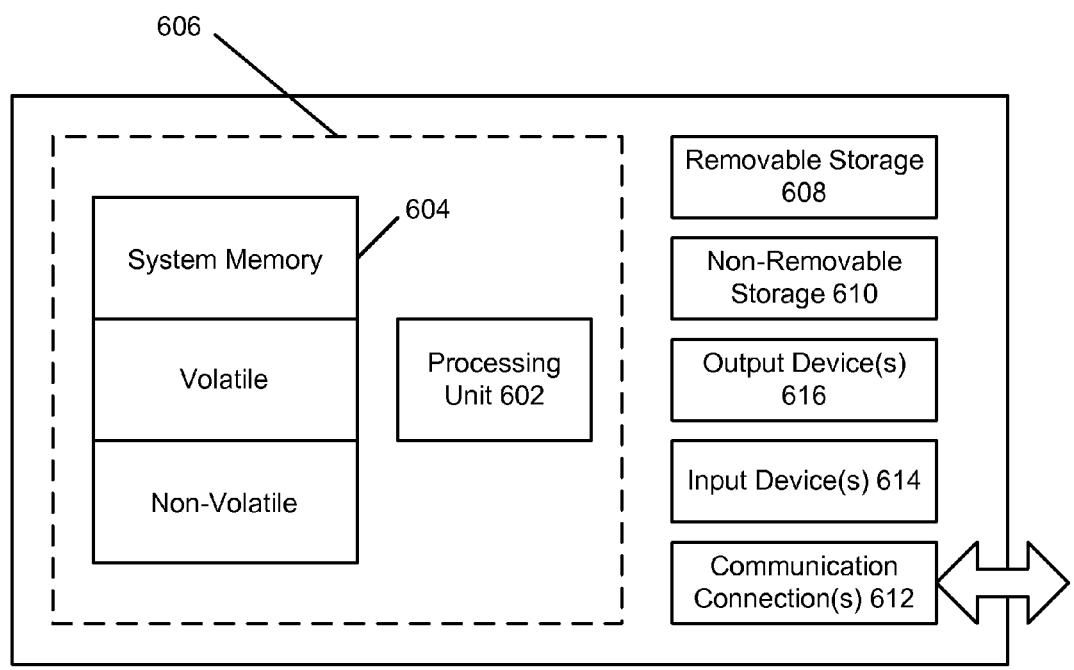
FIG. 6 illustrates an exemplary computing environment.

The server computing device 102A may be connected to a first Local Area Network (LAN) 109A and the server computing device 102B is connected to a second Local Area Network (LAN) 109B that are connected to the communications network 110. It is noted that any number of server computers may be connected to the communications network 110 in accordance with the present disclosure. FIG. 6 illustrates an exemplary computing device that may be used as the server computing device 102A, the server computing device 102B, or the client computing devices 112A, 112B, 112C . . . 112N.

Figure 1:
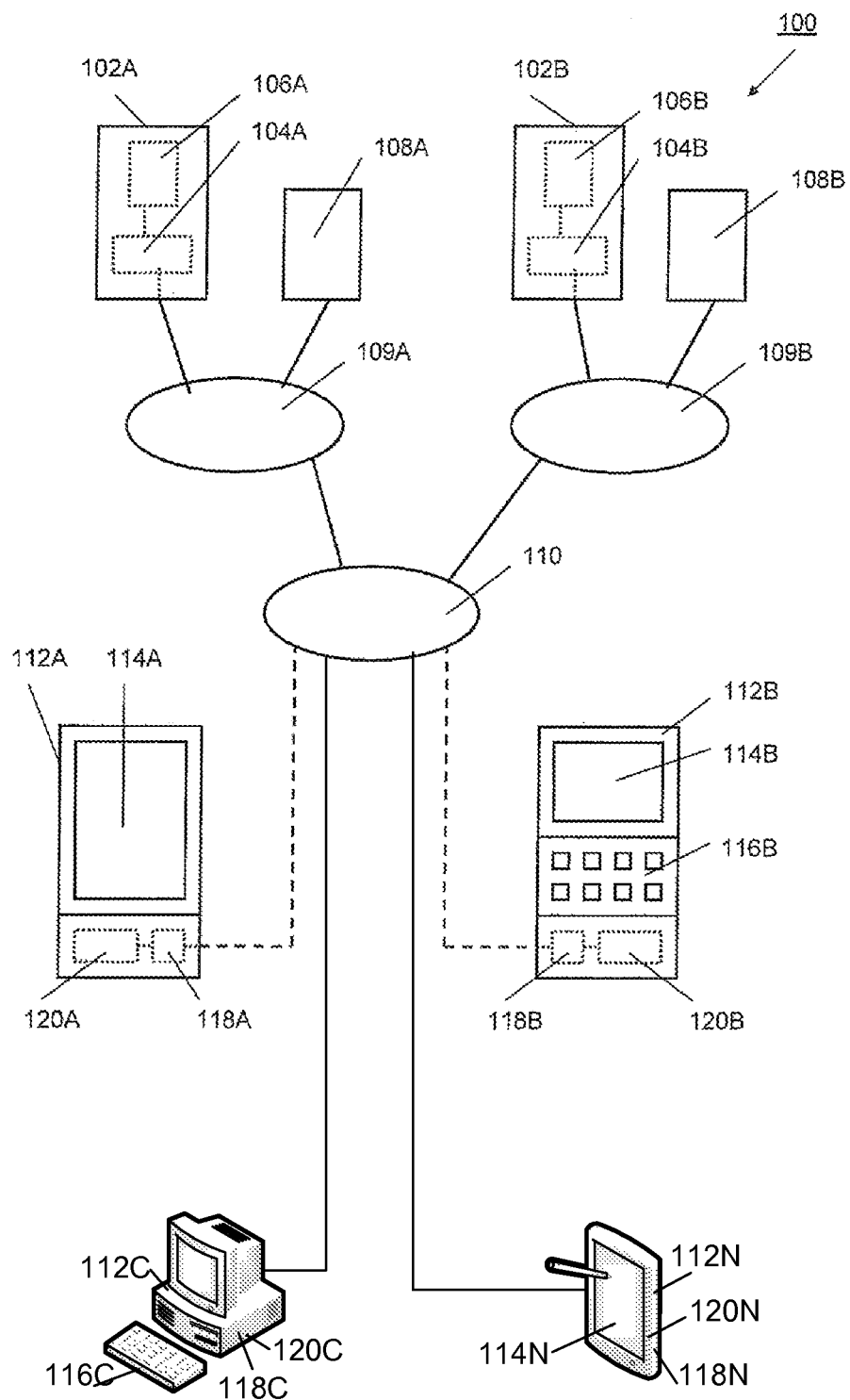
FIG. 1 is a simplified block diagram illustrating a system for providing remote access to an application program via a computer network.

As shown in FIG. 1, a client remote access program is executed on a processor 118A, 118B, 118C . . . 118N of the client computing devices 112A, 112B, 112C . . . 112N. The client remote access program is provide as executable commands stored in memory 120A, 120B, 120C . . . 120N of the client computing devices 112A, 112B, 112C . . . 112N. The client remote access program communicates with a user interaction program such as, for example, a web browser or native application. The user interaction program may display the screen data (from the server computing device 102A or 102B), or receive user input data for interacting with the first and the second screen scraping application using, for example, a graphical display with touch-screen 114A, 114N, a graphical display 114B, or a keyboard 116B, 116C of the client computing devices.

The server remote access programs 107A and 107B and the client remote access program may be implemented using standard programming languages and communication is enabled using standard communication technologies such as, for example, Hyper Text Transfer Protocol (HTTP), virtual private networks (VPN), and secure socket layers (SSL) which are well known to those skilled in the art. Further, an instance of a server remote application may be provided on a different server than the server executing the screen scraping application. In such an implementation, screen data may be communicated over a direct or networked connection between the server executing the screen scraping application and the other server executing the server remote application. In some implementations, the server remote access programs 107A and 107B and the client remote access program enable the implementation of aspects of the present disclosure as a retrofit to existing technologies on the server side as well as on the client side.

Figure 2A:
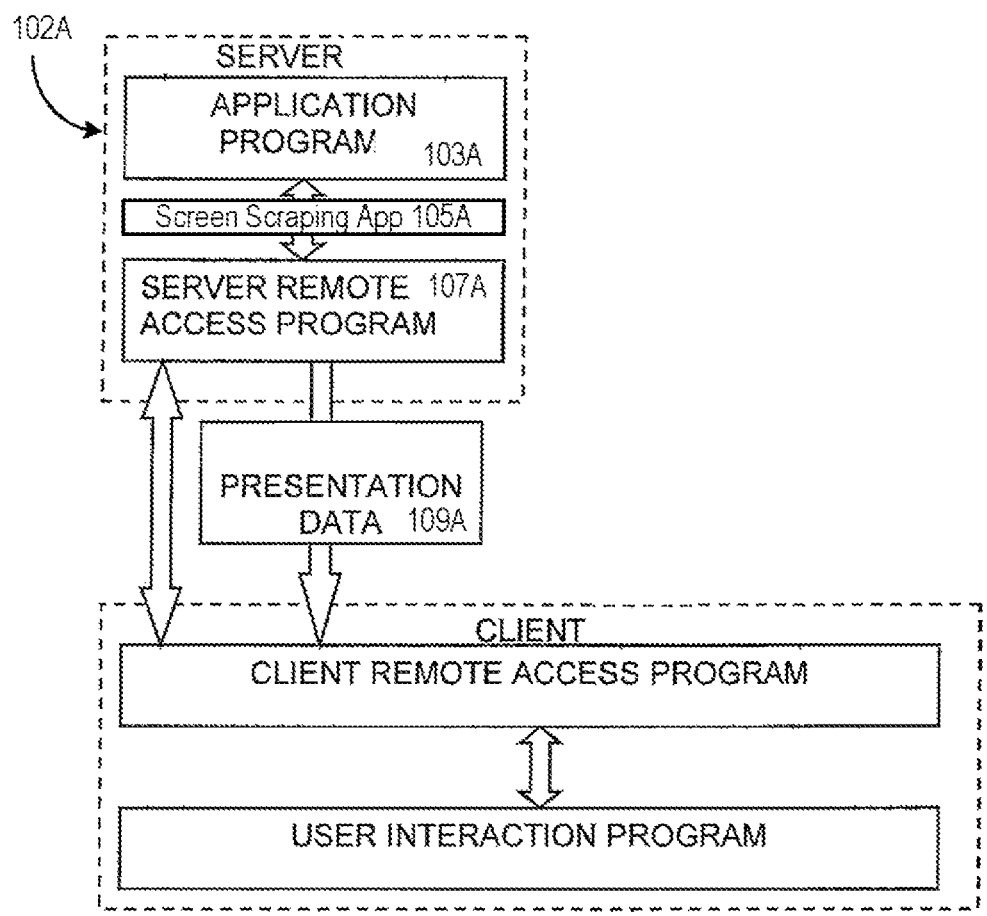
FIGS. 2A-2C are simplified block diagrams illustrating operation of a screen scraping application and server and client remote access program(s)

As shown in FIG. 2A, in accordance with some implementations, the server computing device 102A may execute a screen scraping application 105A that monitors a display interface generated by an application program 103A for events that may cause the pixels in the display to change. The screen scraping application 105A is stored in memory 106A and executed on the processor 104A of the server computing device 102A. As events occur, the screen scraping application 105A reads the changed regions of the display from a frame buffer (not shown), and may compress the screen image data, and send the compressed image data to the respective server remote access program 107A. The server remote access program 107A is stored in the memory 106A and is executed on the processor 104A of the server computing device 102A. In accordance with the present disclosure, the interaction of the screen scraping application 105A with the application program 103A provides for a non-invasive implementation to enable remote access to the application program 103A, as described below.

To provide remote access to the application program 103A, communication is established between, e.g., the client computing device and the server computing device 102A at an enumerated URL associated with the application program 103A. In particular, the communication is enabled by the server remote access program 107A and the client remote access program, as shown in FIG. 2A. The communication may be over any type of network, as noted above. It is noted that any of client computing devices 112A, 112B, 112C . . . 112N may be the client device illustrated in FIG. 2A.

During a remote communications session with the client computing device, the server remote access program 107A receives screen data from the screen scraping application 105A. Upon receipt, the server remote access program 107A generates presentation data 109A of the screen image data and transmits the same to the client remote access program.

Optionally or additionally, the presentation data 109A may be generated according to hardware capabilities of the client computing device 112A, 112B, 112C or 112N, for example, accounting for processing capacity, memory size, type of graphical display, and type of user interface. Thus, the server computing device 102A may scale or resize the screen data that is communicated to the client computing device such that the screen data is displayed on the client computing devices 112A, 112B, 112C . . . 112N in accordance with the characteristics of the device. As such, each type of device that is participating in the collaborative session presents the user interface having a device-appropriate resolution based on information contained in the state model of FIG. 3, described below. For example, presentation data generated and transmitted for a laptop computer are different from presentation data generated and transmitted for a handheld device such as, for example, an IPHONE.

In some implementations, the presentation data 109A is generated based on a selection of a window or display region of the application program 103A. For example, a selection of a region or window to be displayed on the client computing device may be received at the server computing device 102A. The server computing device 102A may then crop the screen data such that only the selected region or window is generated in the presentation data 109A and communicated by the server remote access program 107A to the client remote access program.

In some implementations, the presentation data 109A may also be provided to the server computing device 102A. This enables a user at the server computing device 102A to see what is being displayed at the client computing devices 112A, 112B, 112C or 112N.

Figure 2B:
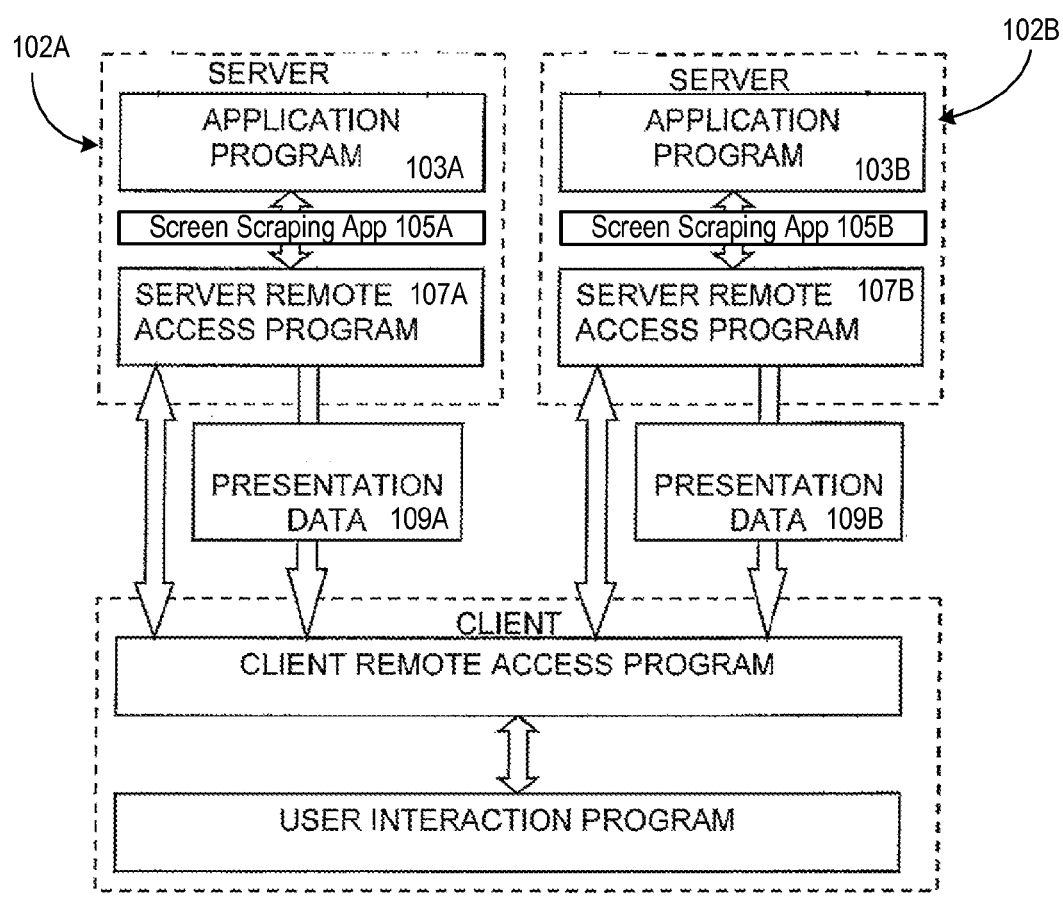

With reference now to FIG. 2B, in some implementations, the client computing device 112A, 112B, 112C or 112N may interact with both application programs 103A and 103B running on the server computing devices 102A and 102B by accessing the application programs 103A and 103B at a respective enumerated URL associated with each of the application programs 103A and 103B. As such, the client computing device 112A, 112B, 112C or 112N may participate in a collaborative session with the server computing device 102A and 102B, and may present a view containing the display of the application programs 103A and 103B.

Optionally or additionally, the display of the application programs 103A and 103B may be presented through a process called recombination, which may be based on information contained in the state model of FIG. 3, described below. With recombination, the application programs 103A and 103B are seamlessly integrated into the same user interface of the client computing device 112A, 112B, 112C or 112N such that views of both application programs 103A and 103B may be presented simultaneously. Optionally or additionally, functionalities and controls associated with the application programs 103A and 103B may be combined within the same user interface.

As shown in FIG. 2B, in accordance with some implementations, the server computers 102A and 102B execute respective screen scraping applications 105A and 105B that monitor a display interface generated by an application program 103A and 103B for events that may cause the pixels in the display to change. As events occur, the screen scraping applications 105A and 105B read the changed regions of the display from a frame buffer (not shown), and may compress the screen image data, and send the compressed image data to the respective server remote access program 107A and 107B. As noted above, the interaction of the screen scraping applications 105A and 105B with the application program 103A and the application program 103B, respectively, provides for a non-invasive implementation to enable remote access to the application program 103A and the application program 103B. Other aspects of the environment of FIG. 2B operate in a substantially similarly fashion, as described with regard to FIG. 2A.

Figure 2C:
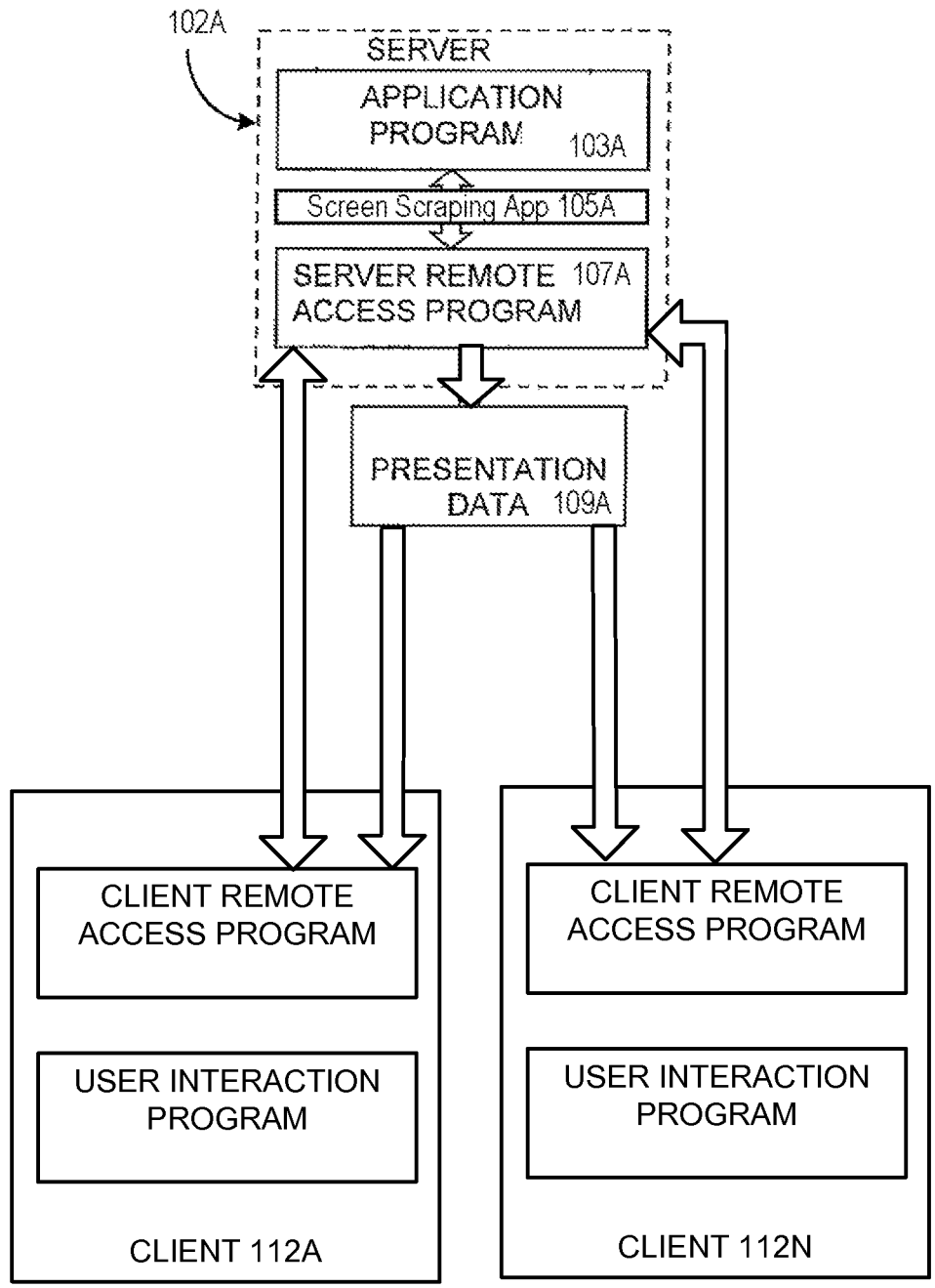

With reference now to FIG. 2C, in some implementations, two or more of the client computing devices 112A, 112B, 112C . . . 112N may collaboratively interact with the application program 103A running on the server computing device 102A by accessing the same enumerated URL. As such, each of the client computing devices 112A, 112B, 112C . . . 112N (and the server computing device 102A) participating in a collaborative session may present a synchronized view of the display of the application program 103A that is made available at an enumerated URL. Alternatively, the client computing devices may interact with the application program 103B running on the server computing device 102B.

During a remote communications session with the client computing device, the server remote access program 107A receives screen data from the screen scraping application 105A. Upon receipt, the server remote access program 107A generates first presentation data 109A of the first screen image data and transmits the same to the client remote access programs 112A and 112N. Other aspects of the environment of FIG. 2C operate in a substantially similarly fashion, as described with regard to FIG. 2A.

The environment of FIG. 2C further provides for collaborative browsing (co-browsing) of the application program 103A. For example, user of client computing device 112A and a user of the client computing device 112N may wish to participate a session that includes the application program 103A at the server computing device 102A. The client computing device 112A and the client computing device 112N may remotely access the application 103A using a client remote access program that communicates with a user interaction program such as, for example, a web browser. Co-browsing of the application program 103A enables users at both the client computing device 112A and the client computing device 112N to interact and view the same documents, images, etc. on the user's respective web browser. Thus, if the user client computing device 112A requests information from the application program 103A for display, the other browser in the session running on client computing device 112N will receive the same information.

In such an implementation, the remote access program 107A may act as a proxy server to intercept requests from the various web browsers in a co-browsing session. A web browser, once configured to use the remote access program 107A as a proxy server, sends a complete URL request to the remote access program 107A. The remote access program 107A then retrieves screen data from the screen scraping application 105A associated with the application program 103A, and sends the result of the request back to the web browsers.

The web browsers may execute a client remote access program (e.g., Flash, Silverlight, Java) to enable the co-browsing session to receive information. Additionally or alternatively, HTML5 may be used to enable the web browser to natively receive information. As such, the web browser may be the client remote access program.

In some implementations, users co-browsing within the system 100 may be interacting with plural application programs 103A and 103B (e.g., a hybrid of the environments of FIGS. 2B and 2C). Accordingly, the present disclosure may provide for recombination of the application programs 103A and 103B, where the applications are seamlessly integrated into the same user interface, which is presented on each of the client computing devices 112A, 112B, 112C . . . 112N participating in the co-browsing session. Recombination may be provided based on information contained in the state model of FIG. 3, described below.

Figure 3:
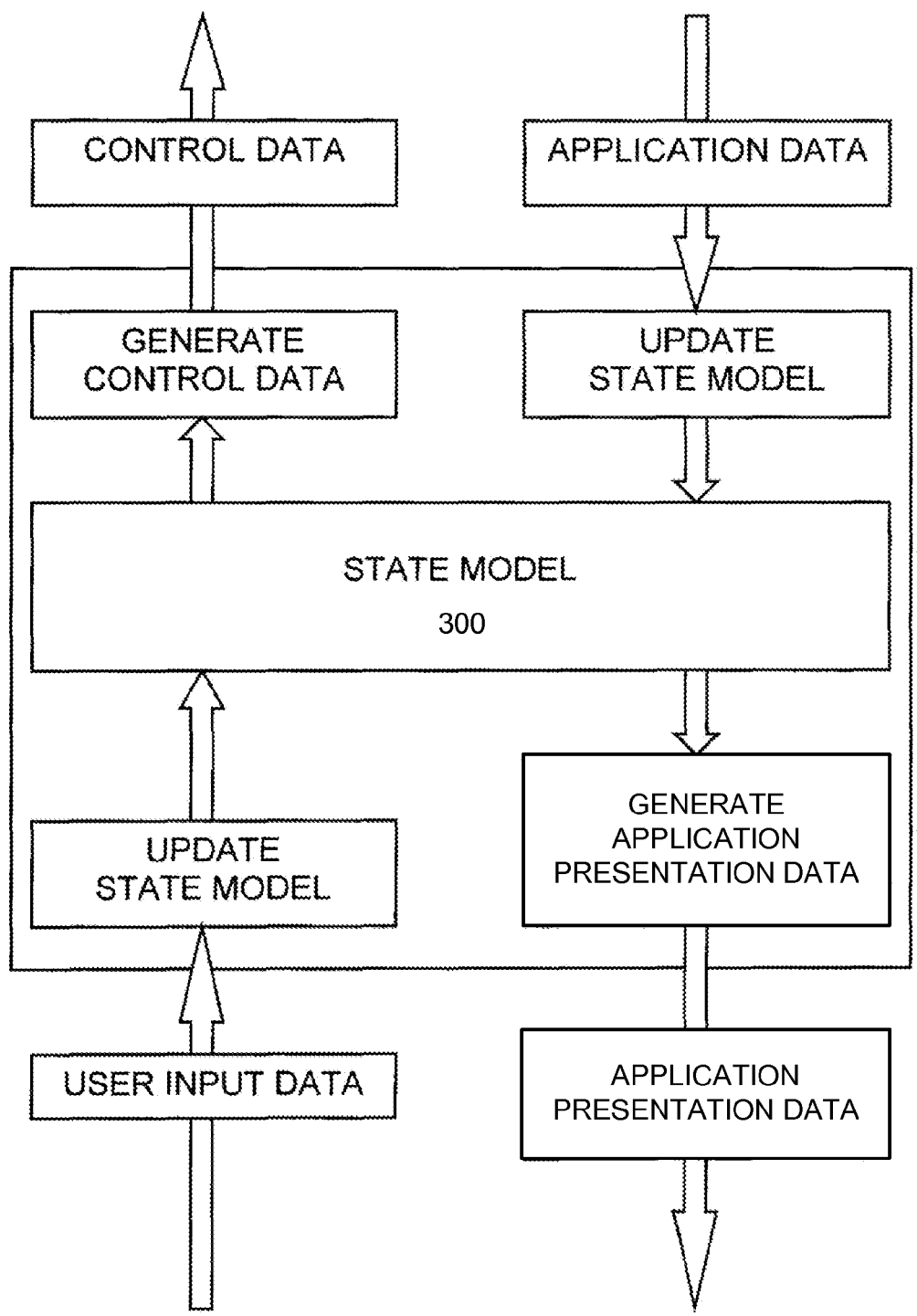
FIG. 3 illustrates a state model of the system of FIG. 1.

In some implementations, the operation of the remote access program (server and client) is performed in cooperation with a state model 300, as illustrated in FIG. 3. When executed, the client remote access program updates the state model 300 in accordance with user input data received from a user interface program. The remote access program may generate control data in accordance with the updated state model, and provide the same to an application program running on the server computing device 102A or 102B (via the screen scraping application). The application program may be any application running on the server computing device 102A or 102B with which an end user interacts using one of the client computing devices 112A, 112B, 112C . . . 112N.

Upon receipt of application data from the screen scraping application, the server remote access program updates the state model 300 in accordance with the screen or application data, generates presentation data in accordance with the updated state model, and provides the same to the user interface program on the client computing device. The state model 300 comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program 103A that is presented on a mobile phone will look like a native menu of the mobile phone. Similarly, the menu of the application program 103A that is presented on desktop computer will look like a native menu of the desktop computer operating system. In accordance with aspects of the present disclosure, the screen image may be communicated as a single logical element in a separate channel to the client. The screen image may be referenced in the state model to enable the client remote access program to retrieve the screen image from the separate channel and display it on the client. As such, the screen will have a substantially similar appearance on each of the client computing devices 112A, 112B, 112C . . . 112N, although it may be scaled according to the characteristics of each device.

The state model 300 is determined such that each of the logical elements is associated with a corresponding state of the application program. The state model 300 may be determined such that the logical elements are associated with user interactions. For example, the logical elements of the application program are determined such that the logical elements comprise transition elements with each transition element relating a change of the state model 300 to one of control data and application representation data associated therewith.

In some implementations, the state information may include a reference or references to one or more rectangular regions that comprise the screen image generated by the application program. A control may be provided by the client remote access program to enable a user to select among the one or more rectangular regions for display at the client device. In some implementations, the control may provide a selection among one or more rectangular regions of screen image data created by plural application programs (e.g., 103A and 103B) for selection by a user.

In some implementations, as noted above with regard to FIGS. 2A-2C, the state information may include information about a state of a display of the client computing device. For example, display resolution may be maintained in the state model 300, which may be used as part of the refactoring of the presentation data in accordance with the client computing device's capabilities. The state model may also include information that may be used for recombination purposes.

Figure 4:
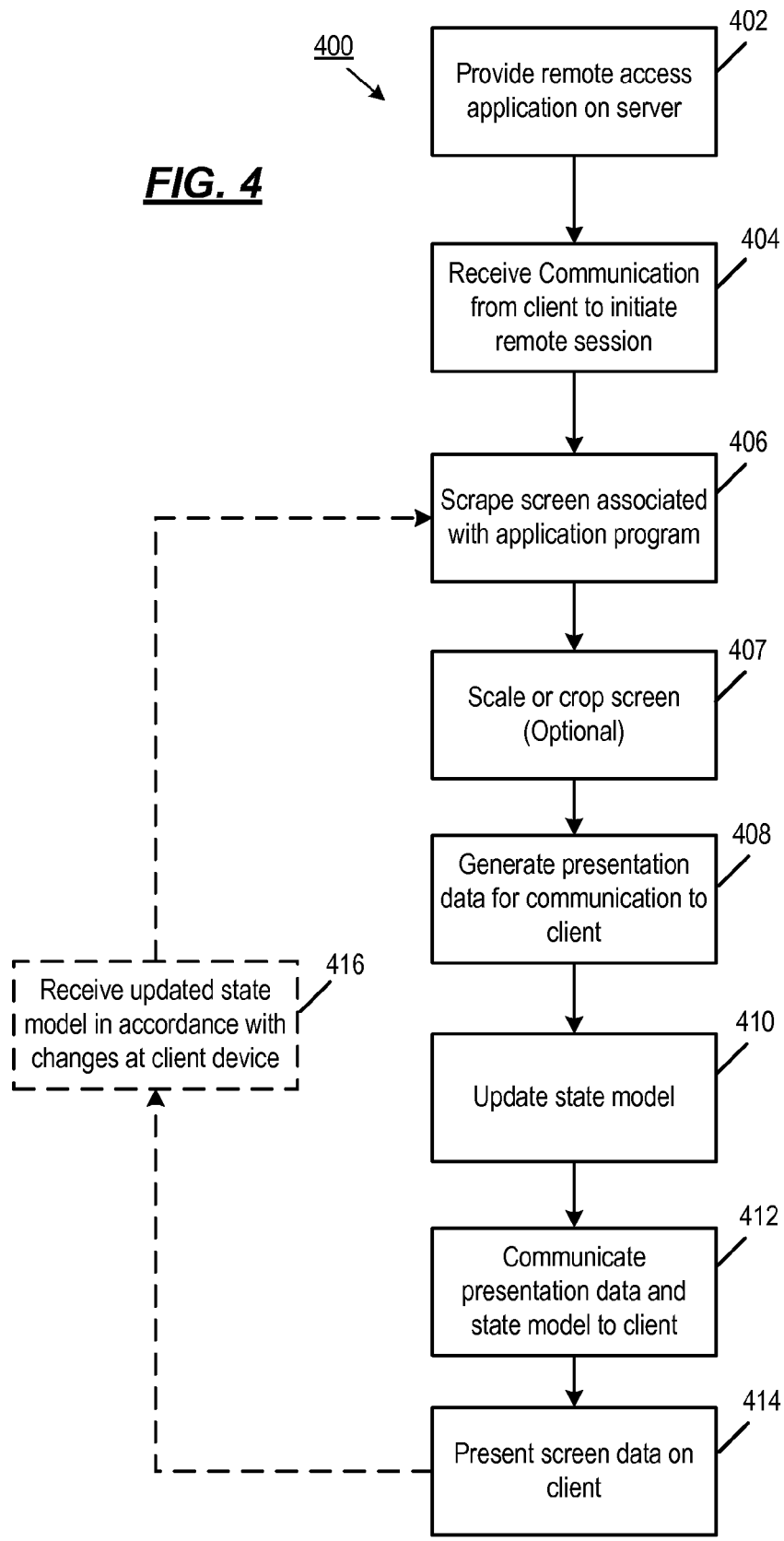
FIG. 4 illustrates a flow diagram of example operations performed within the system of FIGS. 1-3.

FIG. 4 illustrates an operation flow diagram 400 of processes performed to provide remote access to a server-based application program utilizing the state model 300. At 402, a remote access program is provided at a server computing device. For example, server remote access program 107A may be provided on the server computing device 102A to enable remote access by client computing devices running a complementary client remote access program.

At 404, a communication is received from a client. A user may contact the server computing device 102A using the user interaction program on a client computing device. The client may also provide information to the server remote access program 107A about the client computing device's characteristics and capabilities.

At 406, the screen associated with the application is scraped. The display generated by the application program 103A scraped by the screen scraping application 105A. At 407, the screen may be scaled or cropped, if desired, by the application program (service). At 408, the presentation data is generated for communication to the client. In accordance with the client computing device's characteristics and capabilities, the service (i.e., screen scraping application) may scale or crop display information that is provided to the client computing device such that it is appropriately sized for the client computing device.

At 410, the state model is updated. As described above, the state model 300 is determined such that each of the logical elements is associated with a corresponding state of the application program. The screen image, which is communicated in a separate channel, may as a single logical element that is referenced in the state model. At 412, the presentation data and the state model are communicated to the client. The communication may be over the communications network 110. At 414, the screen data is retrieved from the separate channel and presented on the client device for viewing.

In accordance with some implementations, a user may interact with the application program 103A through the user interaction program and the cooperation of the client and server remote access programs. As such, the user interaction(s) may be used to update the state model at 416, which may be returned to the server computing device 102A to update the application program 103A.

Thus in view of the above, there is provided a system and method for non-invasively providing remote access to an application program running on a server.

Figure 5:
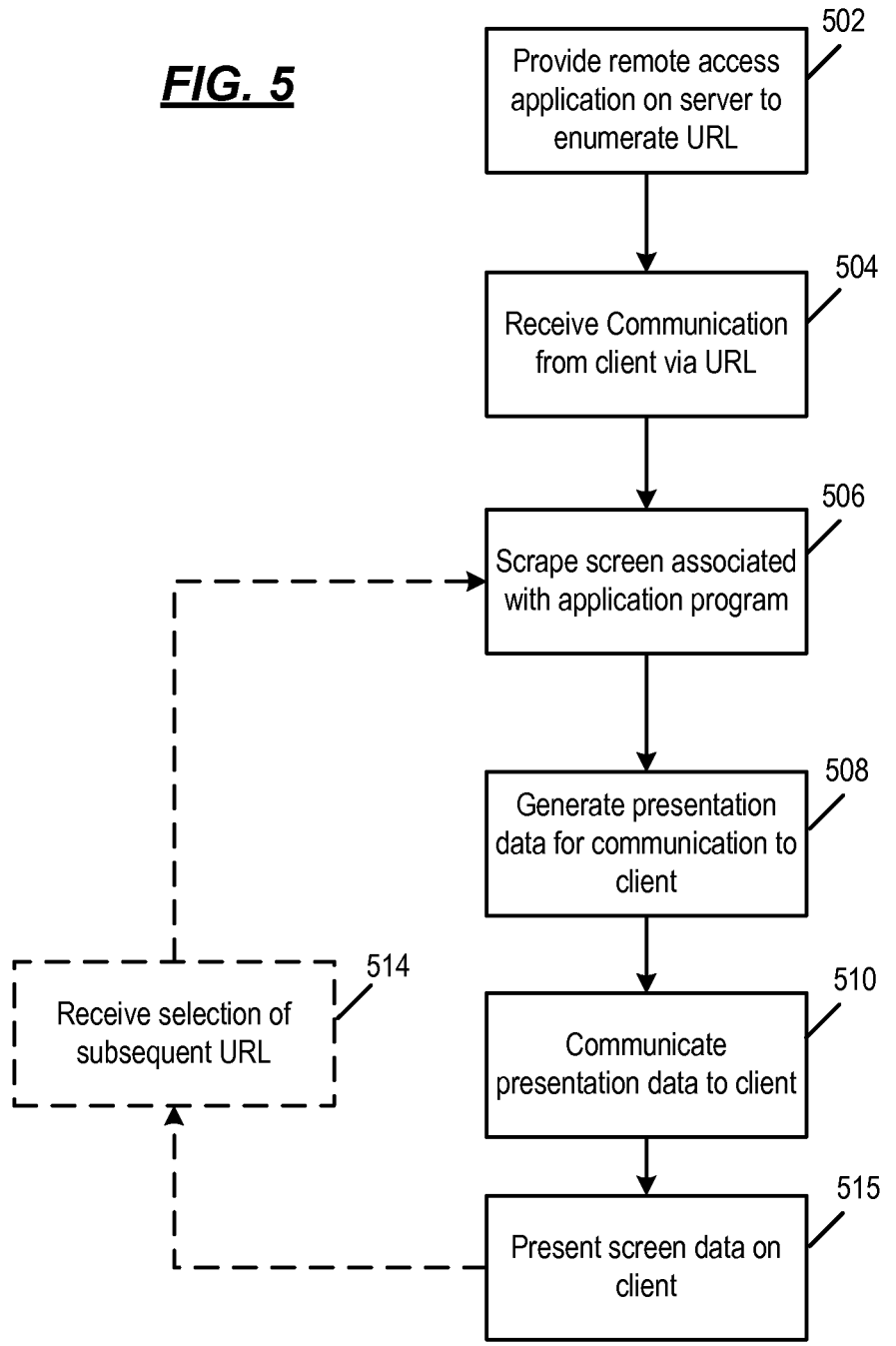
FIG. 5 illustrates a flow diagram of example operations performed within the system of FIGS. 1-2.

FIG. 5 illustrates an operation flow diagram 500 of processes performed to provide remote access to a server-based application program. In some implementations, the server remote access programs 107A and 107B generate one or more Uniform Resource Locators (URL) by which the client computing device is able to connect to one or more application programs running on the server computing device 102A or 102B. Each application program may have a unique URL associated therewith. The URLs are communicated to a client computing device to enable a user to select and interact with one or more of the application programs on the server computing device. For example, in the user interaction program, icons, links, menu items, etc. may be presented that represent each of the enumerated URLs. A user may select the URL by a selection of the appropriate icon, link, menu item, etc.

In the operational flow 500, the URL mechanism described above is employed to provide remote access to the server-based application program. At 502, a remote access program is provided at a server computing device to enumerate one or more URLs associated with one or more applications. For example, server remote access program 107A may be provided on the server computing device 102A. A URL may be accessed within the user interaction program on a client computing device to access, e.g., the application program 103A running on the server computing device 102A. The server remote access program 107A may determine which application programs are running on the server computing device 102A to enumerate the URL associated with each of the applications and to provide access to the determined application programs at the URL.

At 504, a communication is received from a client. A user may contact the server computing device 102A by connecting to one or more of the enumerated URLs that are provided in the user interaction program on a client computing device. The client may also provide information to the server remote access program 107A about the client computing device's characteristics and capabilities.

At 506, the screen associated with the application is scraped. The display generated by the application program 103A scraped by the screen scraping application 105A. At 508, the presentation data is generated for communication to the client. In accordance with the client computing device's characteristics and capabilities, the server computing device 102A may scale, resize or crop display information that is provided to the client computing device such that it is appropriately sized for the client computing device.

At 510, the presentation data is communicated to the client. The communication may be over the communications network 110. At 512, the screen data is presented on the client device for viewing. In accordance with some implementations, a user may interact with the application program 103A through the user interaction program and the cooperation of the client and server remote access programs. As such, the user interaction(s) may be used to access one or more URLs presented in the user interaction program. At 514, a connection may be established via a selected URL such that the user may interact with a different application or currently with multiple applications. Further, more than one client computing device may remotely interact with an application program in accordance with FIG. 3 to provide a collaborative environment where plural client computing devices concurrently interact with the application program at an enumerated URL.

Thus in view of the above, there is provided yet another system and method for non-invasively providing remote access to an application program running on a server.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of tangible computer readable media. Tangible computer readable media can be any available media that can be accessed by device 600 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing remote access to at least one application program executing on a server computing device that is connected to clients over a network, comprising:
   executing a server remote access program at the server computing device;
   enumerating, on the server computing device, at least one Uniform Resource Locator (URL) associated with the at least one application program to provide remote access to the at least one application program;
   generating, by the at least one application program, a display interface on the server computing device;
   receiving a request from one of plural client computing devices at the at least one URL;
   executing a screen scraping application at the server computing device to scrape screen data from the display interface on the server computing device;
   generating presentation data from the screen data at the server computing device, the presentation data being generated in accordance with a selection of a display region of the at least one application program; and communicating the presentation data to each of the plural client computing devices using the server remote access program.

2. The method of claim 1, further comprising determining that the at least one application program is executing on the server computing device; and enumerating the URL in response to the determining.

3. The method of claim 2, further comprising enumerating a unique URL for each application program determined to be executing.

4. The method of claim 3, further providing access to the unique URL using one of a link, a menu time, or an icon.

5. The method of claim 1, further comprising:
receiving plural requests at plural URLs from the plural client computing devices each of the plural URLs being associated with a respective one of plural applications;
scraping screen data associated with the plural applications associated with the plural URLs;
generating presentation data from the screen data; and
communicating the presentation data to the plural client computing devices.

6. The method of claim 1, further comprising providing collaboration among the plural client computing devices, wherein the presentation data is synchronized among the plural client computing devices.

7. The method of claim 1, further comprising generating the presentation data in accordance with hardware capabilities of each of the plural client computing devices.

8. The method of claim 7, wherein the hardware capabilities include one of processing capacity, memory size, type of graphical display, and type of user interface associated with each of the plural client computing devices.

9. The method of claim 7, further comprising:
receiving information regarding a screen size of the plural client computing devices; and
generating the presentation data by scaling or resizing the screen data in accordance with the screen size.

10. The method of claim 1, further comprising providing the presentation data the server computing device.

* * * * *